United States Patent [19]

Pike

[11] 4,313,924
[45] Feb. 2, 1982

[54] PROCESS FOR REMOVAL OF SULFUR DIOXIDE FROM GAS STREAMS

[75] Inventor: Daniel E. Pike, Harrington Park, N.J.

[73] Assignee: Neptune AirPol, Inc., Englewood, N.J.

[21] Appl. No.: 37,844

[22] Filed: May 10, 1979

[51] Int. Cl.$^3$ .............................................. C01B 17/00
[52] U.S. Cl. .................................. 423/242; 423/512 A
[58] Field of Search ............ 423/242 A, 242 R, 512 A

[56] References Cited

U.S. PATENT DOCUMENTS 3,911,084  10/1975  Wall .................................... 423/242

FOREIGN PATENT DOCUMENTS 49-48599  5/1974  Japan .................................... 423/242

OTHER PUBLICATIONS

Boynton, Chemistry and Technology of Lime and Limestone, 1966, p. 317.

*Primary Examiner*—O. R. Vertiz
*Assistant Examiner*—Gregory A. Heller
*Attorney, Agent, or Firm*—Fitzpatrick, Cella, Harper & Scinto

[57] ABSTRACT

An improved apparatus and process are disclosed for the removal of sulfur oxides such as sulfur dioxide from waste gas streams. The process comprises scrubbing the waste gas with a circulating aqueous sodium sulfite/sodium bisulfite absorption solution at a relatively low pH followed by subjecting a portion of the circulating absorption solution to an improved multi-stage regeneration procedure wherein lime is employed to regenerate sulfite from bisulfite. The bleed from the scrubbing step which is subjected to regneration has a low pH and hence can dissolve more lime thereby increasing the lime utilization efficiency. In the regeneration procedure, a lime slurry is separated into a slurry of coarser lime particles and a second portion which contains very fine lime particles. The main regeneration is accomplished by adding the coarse lime slurry to the scrubber bleed. Due to the low pH in this reaction, not all the bisulfite is regenerated to sulfite. However, any remaining bisulfite is regenerated to sulfite in later regeneration steps by reaction with the second portion of the lime slurry in order to precipitate as much calcium as possible in the form of sulfate.

8 Claims, 2 Drawing Figures

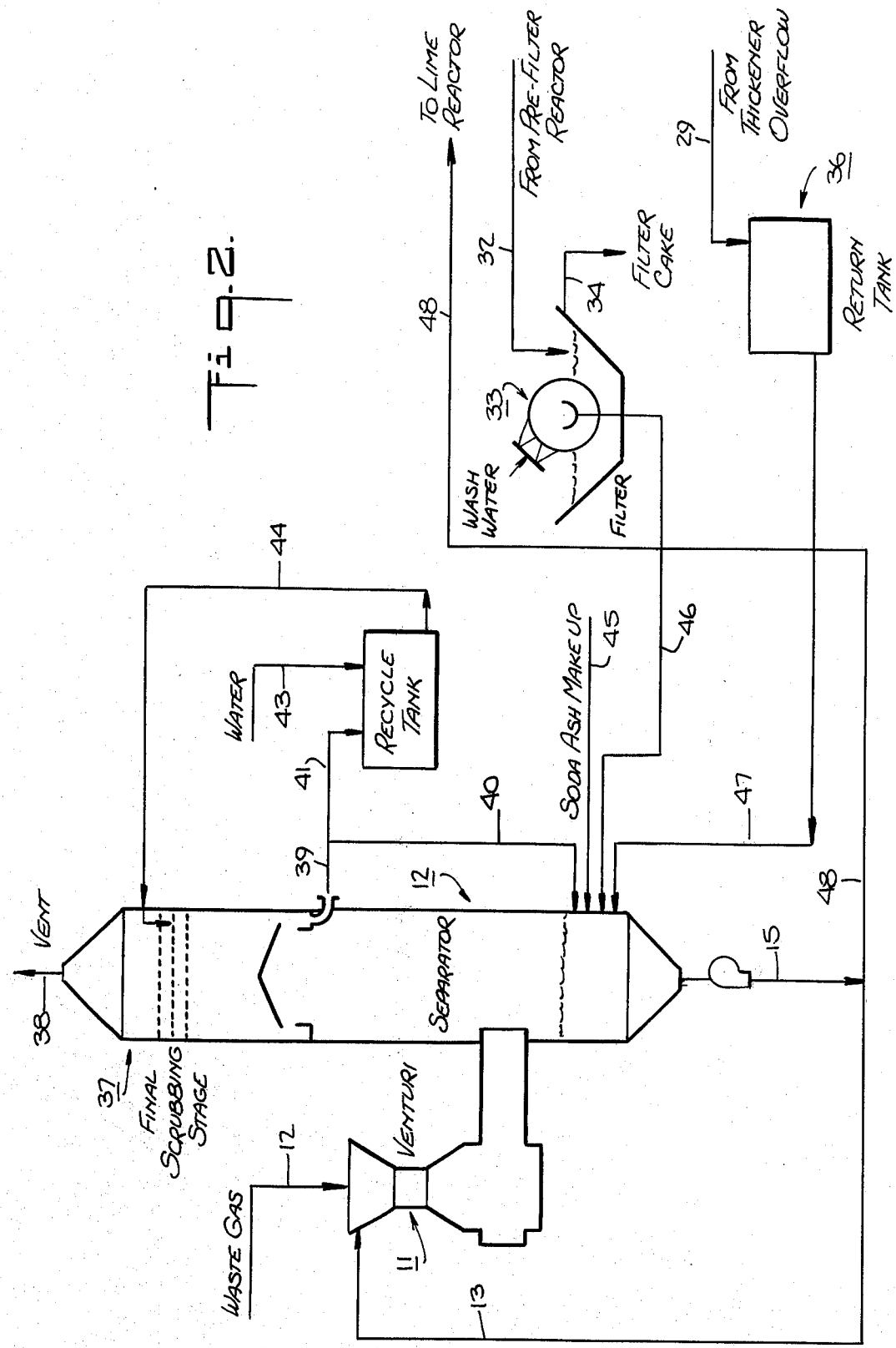

PROCESS FOR REMOVAL OF SULFUR DIOXIDE FROM GAS STREAMS

BACKGROUND OF THE INVENTION

1. Field of the Invention

This invention relates to a process for removing pollutants from gas streams; more particularly, it relates to a process for removing sulfur oxides from waste gas streams containing same. In a preferred embodiment, this invention relates to an improved double alkali process for removing sulfur dioxide from gas streams containing same.

2. Description of the Prior Art

For various reasons, it is necessary and desirable to remove pollutants such as sulfur oxides, particularly sulfur dioxide ($SO_2$), from gas streams containing same. A prime source of such gas streams comprises the waste gases derived from the combustion of sulfur-containing fuels, although they can also be generated by other gas producing processes.

Many different processes have been suggested for removing sulfur oxides such as sulfur dioxide from waste gases including, for example, scrubbing with a solution of sodium carbonate or sodium hydroxide; scrubbing with lime or a limestone slurry; or by the so-called double alkali process. The first process is simple but its application is limited since the resulting dissolved solids must be treated and fed to waste in a liquid stream. The lime or limestone scrubbing process produces a low-solubility solid waste, but although the cost of the scrubbing chemicals is low, the capital requirements are high due to the high circulation rates required and the possibility of deposition of solid scale in various parts of the system which necessitates periodic cleaning and/or replacement.

The double alkali process remedies some of these deficiencies and generally comprises scrubbing the sulfur oxide containing gas with an alkali such as a sodium or potassium solution, followed by the addition of another alkali such as lime to at least a portion of the resulting scrubber effluent to regenerate the alkali scrubbing solution. The primary advantage of the double alkali process is that the scrubbing step produces only soluble materials and that insoluble materials are formed only in areas outside the scrubber. However, such double alkali processes of the prior art were deficient in that the regeneration efficiency was not high and a predominantly sulfite filter cake was produced which is difficult to handle.

One such double alkali process is disclosed in U.S. Pat. No. 3,911,084. As disclosed therein, a circulating aqueous extracting/scrubbing solution of sodium sulfite and sodium bisulfite is provided having a specified pH of 6–7. Make-up for the extracting solution may be obtained using a soluble alkali sodium compound solution with a pH of 8–12. Upon contact with the sulfur dioxide-containing gas stream, $SO_2$ is absorbed by the extracting/scrubbing solution and an extract is formed having a relatively lower pH and a relatively higher sodium bisulfite content. At least a portion of the extract is regenerated in a single step by reaction with a calcium compound such as lime to form a slurry containing dissolved sodium sulfite and solid calcium sulfite and having a pH of 8–10. After separating solids therefrom, the regenerated sodium sulfite solution is mixed with the circulating extracting/scrubbing solution to maintain its pH at 6–7.

As in the above patent, most sodium-based processes utilize caustic (i.e., NaOH) or soda ash (i.e., sodium carbonate, $Na_2CO_3$) as make-up to the scrubbing solution. Such a scrubbing solution always contains sodium bisulfite ($NaHSO_3$) and sodium sulfite ($Na_2SO_3$) since the reactions shown in the following equations (1) and (2) occur spontaneously and reaction (3) represents the main $SO_2$ absorption reaction:

$$Na_2CO_3 + NaHSO_3 \rightarrow 2Na_2SO_3 + CO_2 + H_2O \quad (1)$$

$$NaOH + NaHSO_3 \rightarrow Na_2SO_3 + H_2O \quad (2)$$

$$SO_2 + Na_2SO_3 + H_2O \rightarrow 2NaHSO_3 \quad (3)$$

In addition, the scrubbing solution may also contain sodium sulfate ($Na_2SO_4$) due to oxidation of sodium sulfite by any free oxygen in the gases and also because of the possible formation of sodium sulfate during regeneration which is recycled to the scrubbing step. Therefore, as a result of the scrubbing or absorption step, an aqueous solution is produced containing relatively less sodium sulfite, relatively more sodium bisulfite and some sodium sulfate.

In the regeneration step, the calcium compound added, e.g., $Ca(OH)_2$, reacts with the sodium bisulfite forming solid calcium sulfite ($CaSO_3$) and regenerating sodium sulfite as shown in equation (4):

$$2NaHSO_3 + Ca(OH)_2 \rightarrow CaSO_3 \downarrow + Na_2SO_3 + H_2O \quad (4)$$

However, depending on the pH and other conditions of the regenerating reaction, one or both of solid calcium sulfate and dissolved sodium sulfate may be formed. Specifically, at a pH of less than 8 and higher than 10, a greater portion of solid calcium sulfate tends to form rather than solid calcium sulfite but since the former is more water soluble than the latter and hence tends to go back into solution as sodium sulfate, while more calcium sulfite precipitates, a solid phase equilibrium is reached. Hence, depending predominantly on the pH of the regeneration, some sodium sulfate may be formed in the thickener and recycled to the scrubbing step with the regenerated sodium sulfite. In fact, the sodium sulfate concentration is permitted to equilibrate in the process disclosed in the aforementioned U.S. Pat. No. 3,911,084, in order to reduce the undesired removal of sulfite/bisulfite values with the solid precipitate.

Other processes for removing sulfur dioxide from waste gases are disclosed in, for example, U.S. Pat. Nos. 3,775,532; 3,653,812; 3,477,815; 3,485,581; 3,542,511; 3,607,033; 3,622,443; and 1,271,899.

SUMMARY OF THE INVENTION

The present invention provides an improved sodium-based double alkali process, and the apparatus for performing the process, for the removal of sulfur oxides, particularly sulfur dioxide, from gas streams containing same. The process comprises a scrubbing or absorption step in which the $SO_2$-containing gas is scrubbed with a circulating aqueous absorption solution of sodium sulfite and sodium bisulfite at the lowest possible pH that will provide the required $SO_2$ removal; followed by an improved regeneration procedure wherein lime is employed to regenerate sulfite from at least a portion of the bisulfite in the circulating aqueous absorption solution.

Since the pH of the circulating solution is as low as possible, it can dissolve more lime thereby increasing the lime utilization efficiency in the regeneration step. The regeneration procedure includes first separating (i.e., classifying) the lime into two portions; i.e., a slurry of coarser lime particles and a second or active lime portion which contains very fine lime particles. The main regeneration is accomplished at a pH of less than 8 by adding the coarse lime slurry to that portion of the absorption solution undergoing regeneration. Due to the low pH of the absorption solution, not all the bisulfite therein is regenerated to sulfite by the main regeneration. The second or active lime portion is utilized in later regeneration steps to regenerate sulfite from any remaining bisulfite and precipitate as much calcium as possible in the form of sulfate.

Specifically, the slurry produced by the main regeneration, having a low pH and containing solid calcium sulfite, solid calcium sulfate, and dissolved sodium sulfite, sodium sulfate and sodium bisulfite, is fed to a thickener where it flows through over a long retention time to produce a thickened slurry underflow of calcium sulfate and calcium sulfite, containing some sodium bisulfite, and a liquid overflow solution of sodium sulfite, some sodium bisulfite and some sodium sulfate. The slurry underflow from the thickener is reacted with the active lime portion of the lime slurry at high pH to form a slurry containing sodium hydroxide derived from the bisulfite as well as a mixture of precipitated solid calcium sulfate and calcium sulfite. This slurry reaction product is immediately filtered to prevent the solid calcium sulfate from going back into solution, thereby maximizing the sulfate removal.

The liquid filtrate (containing sodium sulfite, sodium hydroxide and sodium sulfate) is mixed with the liquid overflow from the thickener and any remaining bisulfite in the latter reacts with the sodium hydroxide producing a totally regenerated aqueous solution containing only dissolved sodium sulfite and a reduced amount of sodium sulfate which is recycled to the circulating absorption solution.

The double alkali process of the present invention has a number of advantages over other double alkali processes, for the following reasons. First, since most of the regeneration of sulfite is done at a low pH in the lime reactor, a more complete utilization of the lime regeneration agent is assured. In addition, the division of the lime into two portions provides more active lime for the final precipitation of calcium sulfate as well as pH control. Further, the final filter cake produced by the process of the invention can be adjusted to contain more calcium sulfate which, due to its greater load bearing strength, is more suitable for disposal as land fill. An additional advantage is that sulfate accumulation in the scrubber can be controlled within defined limits to avoid undesirable deposition of solid sulfates.

BRIEF DESCRIPTION OF THE DRAWINGS

FIG. 2 illustrates a two-stage scrubbing operation according to the invention.

DESCRIPTION OF THE PREFERRED EMBODIMENTS

Figure 1:
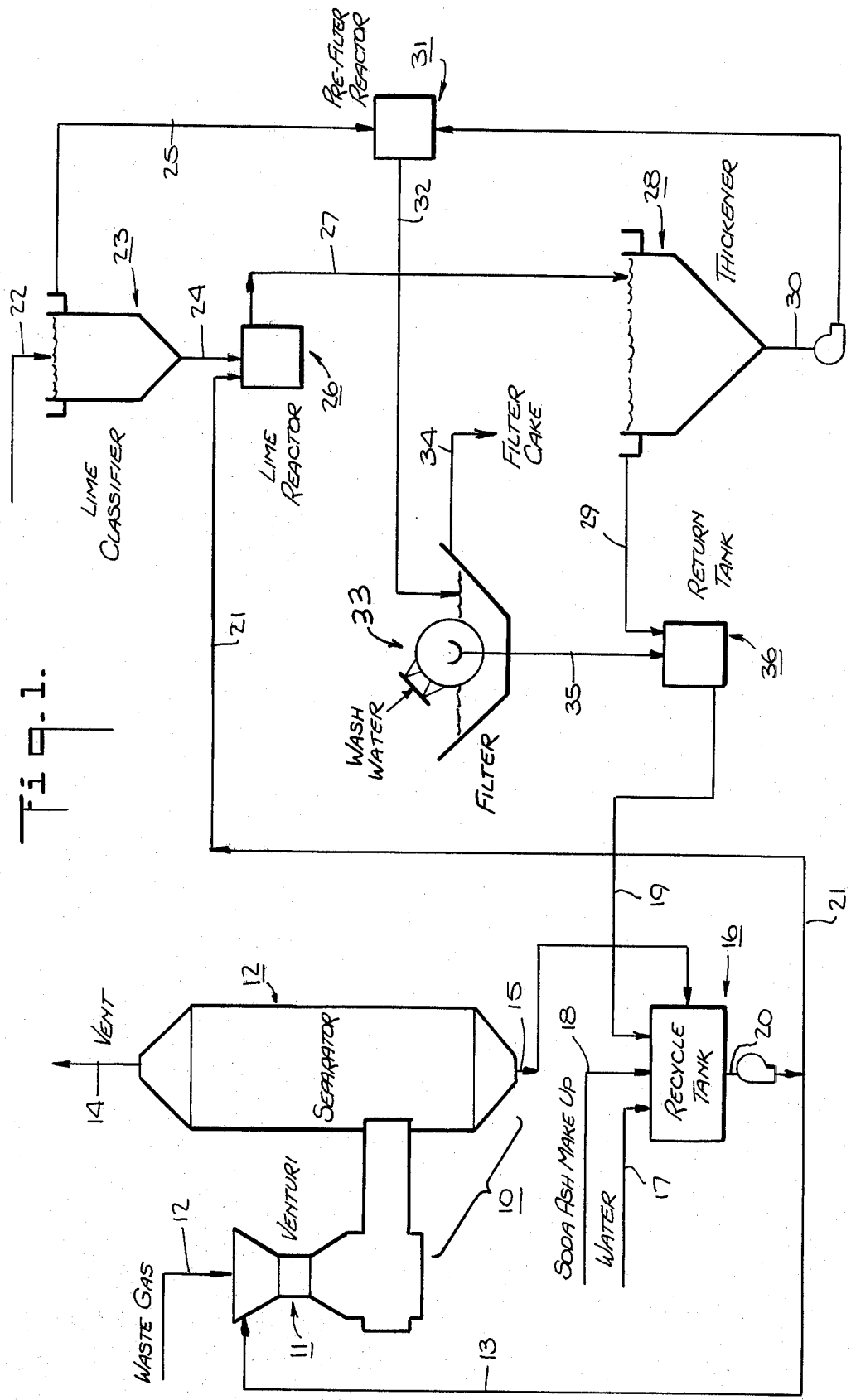
FIG. 1 is a schematic diagram of the present invention showing both a one-stage scrubbing or absorption step and the various steps in the regeneration procedure of the invention.

A problem in double alkali processes using lime as the regenerating agent is the dissolution of the lime. This occurs not only in the lime slaker but, more importantly, in the regeneration step itself. Before lime can react, it must dissolve to form calcium ions. The calcium ions are rapidly depleted by the formation of precipitated calcium sulfite and calcium sulfate. The rate of lime dissolution therefore controls this precipitation and hence, as a general rule, the more acid the solution being regenerated, the faster the lime will dissolve.

A significant feature of the present invention is that the lime slurry from the slaker is classified or separated into two vertical portions. The lowermost first portion, comprising suspended coarse lime particles, is then used in the main regenerating step of the invention. The uppermost second portion, comprising suspended very fine active lime particles, is used in a later regeneration step to precipitate calcium sulfate. Although lime is soluble in water only with difficulty the above second portion does contain some dissolved lime. Therefore, it will be referred to herein as an active lime solution although those skilled in the art will appreciate that it is not entirely a true solution since it will also contain undissolved very fine lime particles.

The scrubbing or absorption step of the process of the invention is designed to operate at the lowest possible pH to provide the required sulfur dioxide absorption. In practice, this can be regulated as desired to achieve the necessary sulfur dioxide removal from the waste gas being treated. In this way, the bleed stream removed from the circulating absorption solution for regeneration will be capable of dissolving more lime thereby increasing the utilization efficiency of the lime in the regeneration step.

The main regeneration step of the invention, utilizing the coarse lime slurry from the lowermost portion of the classifier, is accomplished in the concentrated mode, which is defined as any molar concentration of active sodium in an aqueous solution higher than 0.15 molar. However, the regeneration reaction between the active lime solution and the thickener underflow slurry will be in a more dilute mode. In practice, a pre-filter regeneration step may be carried out as required to remove sulfates from the system and to regenerate any remaining bisulfite.

FIG. 1 illustrates one embodiment of the present invention. The apparatus as shown includes a so-called one-stage scrubbing system or Venturi scrubber 10 which includes a known Venturi 11 and a known separator 12. Referring to FIG. 1, a waste gas is fed to the Venturi 11 or similar device via stream 12. It is mixed in the Venturi 11 with a circulating aqueous scrubbing or absorption solution which is fed to the Venturi 11 via line 13. The resulting gas-liquid mixture is then delivered to a gas-liquid separator 12 from which the scrubbed gas may be vented to the atmosphere in stream 14. The resulting liquid effluent is led from the separator 12 in stream 15 and fed to a recycle tank 16. Water and soda ash make-up, as needed, may also be fed to recycle tank 16 through streams 17 and 18, respectively. Also fed to recycle tank 16 is regenerated absorption solution from return tank 36 via stream 19.

The stream exiting from recycle tank 16 via line 20 is split into stream 13 which is recycled to the Venturi 11 and stream 21 which is the scrubber bleed to the regeneration portion of the process.

A typical waste gas from a power plant or the like using a sulfur-containing fuel may contain sulfur dioxide in an amount of 0.05 to 0.5% by volume, together with entrained particulates (e.g., fly ash, soot, etc.), and have an elevated temperature generally in the range of 150° to 300° C. If desired or necessary, the waste gas may be treated prior to scrubbing to remove dry particulates using conventional cyclones.

The circulating aqueous absorption solution is adjusted to have an active sodium content of from 0.1 to 1.0 molar, preferably from 0.2 to 0.5 molar and most preferably about 0.4 molar. The scrubbing solution may also contain dissolved sodium sulfate in an amount of from 0 to 2 molar. The pH of the circulating absorption solution is preferably adjusted within the range of 5 to 6, although the pH can be as low as about 2 or as high as about 8.

By "active sodium" is meant all soluble sodium in the form of sulfite, bisulfite, carbonate, bicarbonate and hydroxide. Higher concentrations can be used but as the concentration of active sodium increases, other factors become dominant. The main advantage to using higher concentrations of active sodium is that it permits use of a smaller bleed rate to the regeneration stage and hence decreases the size of the thickener required. In addition, the higher concentrations reduce oxidation to sulfate in the scrubbing stage. The present invention reduces the sulfate concentration in the scrubbing solution by precipitating more sulfate and removing it in the form of calcium sulfate.

These adjustments may be accomplished by virtue of the soda ash make-up or water make-up supplied to the circulating absorption solution, and also by virtue of the composition of the regenerated solution recycled from the regeneration procedure. In practice, it is convenient to add sodium in the form of soda ash (i.e., sodium carbonate, $Na_2CO_3$) although other soluble sodium salts can be employed, such as sodium hydroxide, sodium sesquicarbonate, etc. These soluble sodium salts react to form sodium sulfite. It may be necessary to add sodium since some sodium values may be lost with the solids removal from the system. The sodium values that are added may be added at any convenient place, such as to the recycle tank 16 as shown in FIG. 1, or directly to the separator (FIG. 2).

The individual pieces of the scrubbing apparatus used in the practice of the invention may be any commercially available equipment, the purpose being to assure adequate contact between the waste gas and circulating absorption solution to achieve the desired sulfur dioxide removal. For example, the Venturi may be a variable throat Venturi such as the commercially available Air-Pol Basic Venturi Scrubber available from Neptune AirPol, Inc., Englewood, N.J., and described in U.S. Pat. No. 3,841,061. The separator may be Neptune Air-Pol's commercially available Air-Clonic or Air-Chev separator. In addition, more than one set of Venturi scrubbers may be arranged in parallel in accordance with the present invention.

As a result of the absorption of sulfur dioxide, the sodium bisulfite content of the circulating absorption solution increases and the pH thereof decreases.

The bleed stream 21, which normally represents from 1 to 15% of stream 20, is fed to a lime reactor 26 together with a coarse lime slurry from lime classifier 23. The slurry may be formed in lime classifier 23 by feeding slaked lime via stream 22 into the classifier 23 followed by removing the coarse slurry from the lowermost part of the classifier via line 24. As pointed out above, the main regeneration is in the concentrated mode. An active lime solution is formed in the uppermost portion of classifier 23, which also contains very fine suspended lime particles, and this is removed from the classifier via line 25.

The reaction in the lime reactor 26 between the bleed solution removed from the absorption step via line 21 and the coarse lime slurry removed from the classifier via line 24 is conducted at a pH of below 8. Due to this pH, all of the bisulfite in the bleed stream would not be expected to be regenerated into sulfite. The low pH is intentionally maintained in the lime reactor in order to dissolve as much lime as possible therein, and the pH of the reaction will depend upon several factors such as the pH of the circulating absorption solution, the Ca(OH)$_2$ content of the coarse lime slurry, and the relative amounts of bleed solution and lime slurry fed to the reactor. The object is to achieve as complete a utilization of the lime as possible and in this connection, the lower the pH, the more complete is the lime utilization. Preferably, the reaction in the lime reactor is conducted at a pH of 7-8.

The resulting slurry is removed from the lime reactor via stream 27 and is fed to a thickener 28 from which the liquid overflow is fed via line 29 to return tank 36. The slurry underflow from the thickener 28 is fed via line 30 to a pre-filter reactor 31 where it is there reacted with the active lime solution formed in the line classifier 23 and fed to the pre-filter reactor via line 25.

Immediately after the pre-filter reaction, the resulting slurry is fed to filter 33 (along with wash water as required) via line 32 from which solid filter cake is removed via line 34 and the filtrate, a regenerated solution, is fed to return tank 36 via line 35, and from the return tank to the recycle tank 16 via line 19.

The reactions which occur during the regeneration procedure are represented in the following equations 5, 6 and 7:

$$2NaHSO_3 + Ca(OH)_2 \rightarrow CaSO_3 \downarrow + Na_2SO_3 + 2H_2O \tag{5}$$

$$Na_2SO_3 + Ca(OH)_2 \rightarrow CaSO_3 \downarrow + 2NaOH \tag{6}$$

$$NaOH + NaHSO_3 \rightarrow Na_2SO_3 + H_2O \tag{7}$$

Reaction (5) represents the main regeneration reaction, this being the reaction which occurs in the lime reactor 29. If the pH of this reaction is about 8.6, it would be expected that all of the bisulfite would be regenerated to sulfite. However, since the pH of the reaction is maintained as low as possible to increase the lime utilization efficiency, the reaction represented by equation (5) does not therefore go to completion such that the stream fed from the lime reactor still contains some bisulfite.

The reaction represented by equation (6) occurs in the pre-filter reactor where the thickener underflow is mixed with the classified active lime solution which is the overflow from the lime classifier. This lime solution contains some very fine lime particles, and as such the lime is very active chemically and reacts instantaneously with the sulfite and bisulfite in the slurry underflow from the thickener, thus precipitating a mixture of calcium sulfite and calcium sulfate in the pre-filter reactor. Any sodium bisulfite not reacted in the main regeneration step is reacted in the pre-filter reactor according to reaction (5).

The precipitate formed in the pre-filter reactor is immediately filtered to prevent the sulfate from going back into solution. The filtrate from filter 33, which has been regenerated to sodium hydroxide (NaOH) by reaction (6), is forwarded to the return tank 36 where it is there mixed with the thickener overflow solution. The reaction represented by equation (7) occurs here between the sodium hydroxide in the filtrate and any remaining sodium bisulfite in the thickener overflow. In this manner, complete regeneration of the bisulfite in the bleed stream 21 to sulfite is accomplished, and the regenerated solution may be fed back to the circulating absorption solution via line 19 as shown in FIG. 1.

The individual pieces of apparatus employed in the regeneration stage may be any commercially available equipment. For example, the lime classifier may be any gravity settling device with a long narrow cone bottom and any conventional thickener and drum filter can be employed.

The process of the present invention is designed for maximum removal of sulfate as calcium sulfate, to a greater degree than in known double alkali processes, for the following reasons. The primary regeneration which takes place in the lime reactor tank is carried out at a lower pH which is more favorable for the precipitation of calcium sulfate than calcium sulfite. Accordingly, the thickener underflow slurry contains more calcium sulfate and the overflow solution from the thickener contains less sodium sulfate. In addition, the active lime solution reacted with the thickener underflow slurry precipitates additional sulfate just prior to filtration to regenerate any remaining bisulfite therein to sodium hydroxide. In the lime reactor tank, a mixture of calcium sulfite and sulfate is precipitated and in the thickener this mixture would normally be allowed to reach an equilibrium state. However, since calcium sulfite is more insoluble than sulfate, the calcium sulfate precipitate goes back into solution while additional calcium sulfite is precipitated. The equilibrium point is a function of pH with more sulfate being precipitated (i.e., less sulfate remaining in solution) at the lower pH values. The present invention takes advantage of this situation by employing a lower pH in the thickener (i.e., normally 7-8) and by precipitating additional sulfite/-sulfate just prior to filtering in the pre-filter reactor. Thus, the slurry is filtered before the sulfite/sulfate mixture reaches equilibrium and sulfate removal is thereby maximized.

An alternate embodiment is shown in FIG. 2. FIG. 2 illustrates a so-called two-stage scrubbing apparatus. Essentially, the only differences between the systems shown in FIGS. 1 and 2 are that a second scrubbing stage is provided in FIG. 2 and the recycle arrangement. In FIG. 1, recycle tank 16 is external of the scrubbing step whereas in FIG. 2, recycle tank 42 is in effect part of the separator 12. The latter is less expensive although the former is more accessible, and either arrangement can be employed in the practice of the present invention.

As shown in FIG. 2 (the same reference numerals including the same parts), the second or final scrubbing stage is conducted in a tray scrubber 37 or other similar device disposed above the separator 12. The gas fed to separator 12 from Venturi 11 passes through tray scrubber 37, where it is scrubbed with the liquid fed to the tray scrubber 37 via line 44 from recycle tank 42, before being vented via line 38. The liquid effluent from separator 12, in line 15, is split into a recycle stream 13 which is recycled to the Venturi 11, the first scrubbing stage, and stream 48 which is fed to the lime reactor to undergo regeneration in the same manner as described above in connection with FIG. 1. The liquid product of the final scrubbing stage is removed from the bottom of tray scrubber 37 via line 39 and split into stream 40 which is fed back into the separator 12 and stream 41 which is fed to a recycle tank 42 together with water as necessary via stream 43. This scrubbing solution is recycled to tray scrubber 37 via line 44. Soda ash make-up is added to the system in separator 12 via line 45 as necessary, and also fed into separator 12 are the liquid filtrate from filter 33 via line 46 and the regenerated liquid from return tank 36 via line 47. As in FIG. 1, filter cake is removed from filter 37 via line 38, and as also shown in FIG. 1, a feed to the return tank 40 is the thickener overflow fed to the return tank via line 32.

Although the apparatus arrangement of FIG. 2 is different from that of FIG. 1, the processing steps are the same, and the same regeneration procedure is employed. It has been noted in many installations that mist containing sodium compounds is formed in the Venturi scrubber, which mist cannot be removed from the gas stream by an ordinary, conventional separator. The second stage scrubber shown in the arrangement of FIG. 2 will collect this mist and return it to the first stage scrubber. Therefore the second stage tray scrubber will not become overly acidic and will be capable of collecting additional sulfur dioxide from the gases.

What is claimed is:

1. A process for the removal of sulfur dioxide from a gas stream containing said sulfur dioxide comprising establishing a circulating aqueous absorption solution of sodium sulfite and sodium bisulfite; contacting said gas stream with said circulating solution to absorb said sulfur dioxide in said solution and produce a second aqueous solution having a lower pH relative to that of said circulating solution and containing sodium sulfite and a higher amount of sodium bisulfite relative to the amount in said circulating solution; regenerating at least a portion of the sodium bisulfite in said second aqueous solution to sodium sulfite; and recycling the regenerated sodium sulfite to said circulating aqueous solution; wherein said sodium bisulfite is regenerated to sodium sulfite by:

(1) reacting a portion of said second aqueous solution with a slurry of coarse lime particles at a pH of less than 8 to produce a second slurry of calcium sulfite and calcium sulfate containing dissolved sodium sulfite and sodium bisulfite, and thickening said second slurry by separating and removing an overhead solution therefrom containing such dissolved sodium bisulfite to thereby produce a thickened slurry underflow;

(2) reacting only the thickened slurry underflow with an aqueous lime solution containing suspended fine lime particles at a high pH to regenerate sodium hydroxide from sodium bisulfite and form a third slurry having a higher content of calcium sulfate than said second slurry;

(3) filtering the resulting third slurry before substantial amounts of calcium sulfate are dissolved in solution to produce a substantially solid filter cake and a liquid filtrate containing soldum sulfite and sodium hydroxide; and (4) recycling said liquid filtrate and said solution separated from the thickened slurry to said circulating aqueous absorption solution.

2. The process of claim 1 wherein the pH of said circulating absorption solution is less than 6.

3. The process of claim 1 wherein the solution separated from said thickened slurry is mixed with said liquid filtrate prior to being recycled to the circulating aqueous absorption solution.

4. The process of claim 1 wherein said aqueous lime solution has a pH of from 11 to 12.5.

5. The process of claim 1, wherein the pH of said circulating aqueous absorption solution is from about 5 to 6.

6. The process of claim 1, wherein said circulating aqueous absorption solution contains dissolved sodium sulfate in an amount of 0 to 2 molar.

7. The process of claim 1, wherein said filtering step is conducted immediately after said reaction between the thickened slurry and the aqueous lime solution.

8. The process of claim 1, wherein the pH of the thickening step is from about 7 to 8.

* * * * *